(12) United States Patent  
Shestak et al.

(10) Patent No.: US 8,908,009 B2  
(45) Date of Patent: ***Dec. 9, 2014

(54) METHOD AND APPARATUS FOR DISPLAYING 3-DIMENSIONAL IMAGE

(75) Inventors: Sergey Shestak, Suwon-si (KR); Dae-sik Kim, Hwaseong-si (KR); Kyung-hoon Cha, Yongin-si (KR); Sang-moo Park, Uijeongbu-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 951 days.

This patent is subject to a terminal disclaimer.

(21) Appl. No.: 12/693,493

(22) Filed: Jan. 26, 2010

(65) Prior Publication Data

US 2010/0188399 A1 Jul. 29, 2010

(30) Foreign Application Priority Data

Jan. 28, 2009 (KR) .................. 10-2009-0006610

(51) Int. Cl.
*H04N 13/00* (2006.01)
*H04N 13/04* (2006.01)
*H04N 9/47* (2006.01)
*G09G 5/00* (2006.01)
*G09G 3/34* (2006.01)
*G09G 3/00* (2006.01)

(52) U.S. Cl.
CPC .......... *H04N 13/0438* (2013.01); *G09G 3/342* (2013.01); *G09G 2310/024* (2013.01); *G09G 3/003* (2013.01)
USPC .................................. 348/42; 348/56; 345/7

(58) Field of Classification Search
USPC ............................................ 348/42; 345/419
See application file for complete search history.

(56) References Cited

U.S. PATENT DOCUMENTS

2007/0200792 A1* 8/2007 Kim et al. ........................ 345/7  
2010/0289883 A1* 11/2010 Goris et al. ..................... 348/56

FOREIGN PATENT DOCUMENTS

KR 10-2007-0099143 A 10/2007  
WO 2006103611 A2 10/2006

OTHER PUBLICATIONS

Woods, Andrew J., et al., "Compatibility of LCD Monitors with Frame-Sequential Stereoscopic 3D Visualisation", IMID/IDMC '06 Digest, (The 6th International Meeting on Information Display, and the 5th International Display Manufacturing Conference), Daegu, South Korea, Aug. 22-25, 2006, pp. 98-102.

* cited by examiner

*Primary Examiner* — Hee-Yong Kim  
(74) *Attorney, Agent, or Firm* — Sughrue Mion, PLLC

(57) ABSTRACT

Provided is a method and apparatus for displaying a 3-dimensional (3D) image. The method includes alternately displaying left and right eye images on a display having a plurality of image lines that are arranged sequentially. Since light emission of all of segments is stopped when the left and right eye images are partially simultaneously displayed, both the left and right eye images can be prevented from being seen at the same time.

17 Claims, 4 Drawing Sheets

METHOD AND APPARATUS FOR DISPLAYING 3-DIMENSIONAL IMAGE

CROSS-REFERENCE TO RELATED PATENT APPLICATION

This application claims priority to Korean Patent Application No. 10-2009-0006610, filed on Jan. 28, 2009, at the Korean Intellectual Property Office, the contents of which are incorporated herein by reference in their entireties.

BACKGROUND

1. Field

The exemplary embodiments relate to a time-multiplexed stereoscopic system, and more particularly, to a method and apparatus for displaying a time-multiplexed stereoscopic image using shutter glasses that alternately block each eye's view.

2. Description of the Related Art

Time-multiplexed stereoscopic systems using shutter glasses have been first introduced on the market to work with cathode ray tube (CRT) monitors. Recently, CRT monitors have been replaced by liquid crystal display (LCD) monitors.

When an LCD is used as a display device in a stereoscopic system, severe stereoscopic crosstalk occurs, i.e., left eye image data leaks to right eye image data and vice versa. A high level of crosstalk deteriorates greatly the quality of stereoscopic images.

Such crosstalk in the stereoscopic system using the LCD occurs due to use of a scan and hold method for image update and a low switching speed of liquid crystal cells.

A scanning backlight includes a plurality of segments that are switchable individually. The segments extend in parallel to image lines, and are arranged in a scanning direction of the image lines, that is, in a vertical direction. The segments are switched on and off in synchronization with refresh times of the image lines. That is, a segment at the same height as an image line is switched on and off in synchronization with the image line. Since a duration for which a particular segment is switched on is shorter than a frame period, the LCD, which is of a scan-and-hold type, can operate like an impulse type CRT. However, the LCD using the scanning backlight may increase the area of a screen in the stereoscopic system using shutter glasses. Since crosstalk still occurs in certain portions of the screen, there is a need to solve this problem.

SUMMARY

The exemplary embodiments provide a method and apparatus for displaying a 3-dimensional (3D) image which can reduce crosstalk between left and right eye images.

According to an exemplary embodiment, there is provided a method of displaying a 3-dimensional (3D) image, the method comprising: alternately displaying left and right eye images on a display device comprising a plurality of image lines that are arranged sequentially; illuminating the display device by using a backlight unit comprising a plurality of segments that correspond to the plurality of image lines and emit light in synchronization with refresh times of the plurality of image lines; and stopping the light emission of all of the plurality of segments of the backlight unit when the left and right eye images are partially simultaneously displayed on the display device.

Delay times may exist between switch-on times of the plurality of segments and the refresh times of the plurality of image lines.

The delay times may be reduced in a scanning direction of the plurality of image lines.

The delay times may be reduced constantly and sequentially in the scanning direction of the plurality of image lines.

The plurality of segments may be divided into at least two groups having different delay times, and segments of each of the at least two groups have the same delay time.

The plurality of segments may have the same switch-on time.

Delay times between switch-off times of the segments and the refresh times of the image lines corresponding to the segments may be increased in a scanning direction of the image lines.

A first segment of the plurality of segments may be switched on after at least a last segment of the plurality of segments is switched off.

A switch-off time of a last segment of the plurality of segments may be the same with a switch-on time of a first segment of the plurality of segments.

According to another exemplary embodiment, there is provided an apparatus for displaying a 3D image, the apparatus comprising: a display device alternately displaying left and right eye images and comprising a plurality of image lines that are arranged sequentially; a backlight unit comprising a plurality of segments that correspond to the plurality of image lines and emit light in synchronization with refresh times of the plurality of image lines; shutter glasses comprising left and right shutter filters that correspond to the left and right eye images displayed on the display device and are switched on selectively; and a control unit controlling the backlight unit and the display device and stopping the light emission of all of the plurality of segments of the backlight unit when the left and right eye images are partially simultaneously displayed on the display device.

The control unit may control delay times to exist between switch-on times of the plurality of segments and the refresh times of the plurality of image lines.

The control unit may control the delay times to be reduced in a scanning direction of the plurality of image lines.

The control unit may control the delay times to be reduced constantly and sequentially in the scanning directions of the plurality of image lines.

The control unit may control each of the plurality of segments to have any one of at least two different delay times.

The control unit may control the plurality of segments to have the same switch-on time.

The control unit may control delay times between switch-off times of the plurality of segments and the refresh times of the image lines corresponding to the segments to be increased in a scanning direction of the image lines.

The control unit may control a first segment of the plurality of segments to be switched on after at least a last segment of the plurality of segments is switched off.

The control unit may control a switch-off time of a last segment of the plurality of segments to be the same with a switch-on time of a first segment of the plurality of segments.

BRIEF DESCRIPTION OF THE DRAWINGS

The above and other features and aspects of the exemplary embodiments will become more apparent by describing in detail exemplary embodiments thereof with reference to the attached drawings in which.

DETAILED DESCRIPTION OF EXEMPLARY EMBODIMENTS

Figure 1:
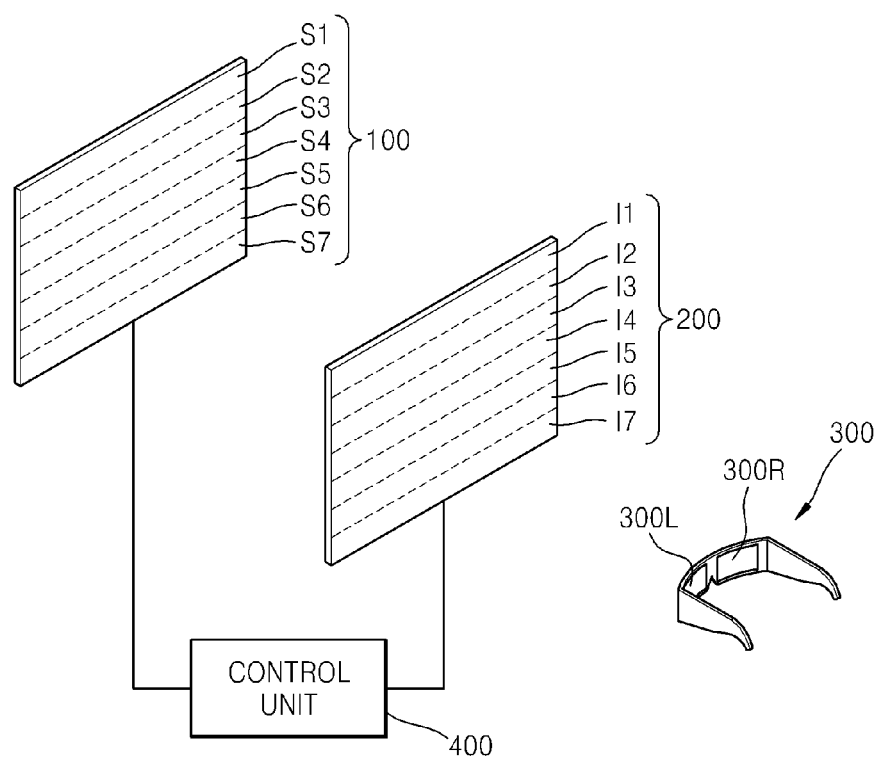
FIG. 1 is a schematic view of an apparatus for displaying a 3-dimensional (3D) image, according to an exemplary embodiment.

The exemplary embodiments are described more fully hereinafter with reference to the accompanying drawings, in which embodiments are shown. This should not be construed as limiting the claims to the exemplary embodiments shown. Rather, these exemplary embodiments are provided to convey the scope of the exemplary embodiments to those skilled in the art. In the drawings, the size and relative sizes of elements and regions may be exaggerated for clarity.

It will be understood that when an element or layer is referred to as being "on", "interposed", "disposed", or "between" another element or layer, it can be directly on, interposed, disposed, or between the other element or layer or intervening elements or layers can be present.

The terms "first," "second," and the like, "primary," "secondary," and the like, as used herein do not denote any order, quantity, or importance, but rather are used to distinguish one element, region, component, layer, or section from another. The terms "front", "back", "bottom", and/or "top" are used herein, unless otherwise noted, merely for convenience of description, and are not limited to any one position or spatial orientation.

The terms "a" and "an" do not denote a limitation of quantity, but rather denote the presence of at least one of the referenced item. The suffix "(s)" as used herein is intended to include both the singular and the plural of the term that it modifies, thereby comprising one or more of that term (e.g., the layer(s) includes one or more layers).

Reference throughout the specification to "one exemplary embodiment", "another exemplary embodiment", "an exemplary embodiment", and so forth, means that a particular element (e.g., feature, structure, and/or characteristic) described in connection with the exemplary embodiment is included in at least one exemplary embodiment described herein, and may or may not be present in other exemplary embodiments. In addition, it is to be understood that the described elements may be combined in any suitable manner in the various exemplary embodiments.

Unless defined otherwise, technical and scientific terms used herein have the same meaning as is commonly understood by one of skill in the art to which the exemplary embodiments belong.

FIG. 1 is a schematic view of an apparatus for displaying a 3-dimensional (3D) image, according to an exemplary embodiment. Referring to FIG. 1, the apparatus includes a liquid crystal display (LCD) 200 that is a non-emissive display requiring an additional light source, and alternately displaying left eye images and right eye images at high speed. Shutter glasses 300 are disposed in front of the LCD 200, and transmit light for the left eye images and blocks light for the right eye images while the left eye images are displayed, and transmit light for the right eye images and block light for left eye images while the right eye images are displayed. The shutter glasses 300 include a left filter 300L controlling the light for the left eye images, and a right filter 300R controlling the light of the right eye images.

A backlight unit 100 is disposed behind the LCD 200 and includes a plurality of segments S1 through S7 that are switched on and off to emit light in synchronization with the LCD 200. In detail, the backlight unit 100 includes the 7 segments S1 through S7, and the LCD 200 includes 7 image lines I1 through I7 corresponding to the 7 segments S1 through S7. Each of the image lines I1 through I7 includes a plurality of scan lines that create an entire image when combined with other lines on a screen.

The segments S1 through S7 of the backlight unit 100 are switched on and off at predetermined time intervals in synchronization with refresh times of the image lines I1 through I7 that correspond in a one-to-one manner to the segments S1 through S7, and the shutter glasses 300 are synchronized with a switch-on time of the first segment S1.

The LCD 200 and the backlight unit 100 are controlled by a control unit 400. The control unit 400 performs most of the following functions, and controls the overall operations of the LCD 200 and the backlight unit 100.

Although the apparatus uses the backlight unit 100 including the 7 segments S1 through S7 in FIG. 1, the present exemplary embodiment is not limited thereto, and thus the number of segments may be properly adjusted to be less or more than 7 without departing from the scope of the present exemplary embodiment.

Figure 2:
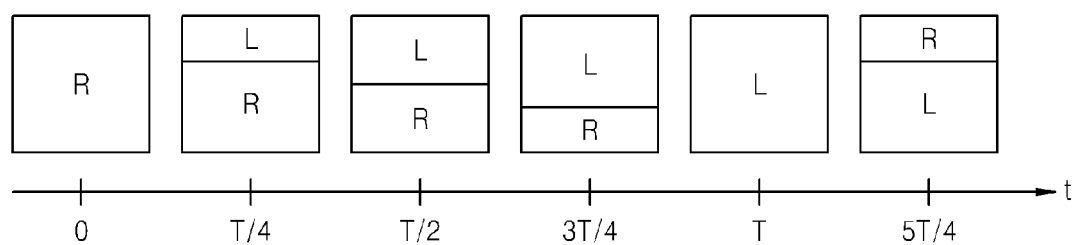
FIG. 2 illustrates left eye images and right eye images periodically scanned on a liquid crystal display (LCD) of the apparatus of FIG. 1.

FIG. 2 illustrates left eye images L and right eye images R periodically scanned on the LCD 200. The LCD 200 sequentially scans an image (a right eye image R or a left eye image L) of one frame from an upper portion to a lower portion of a screen. While an image of a previous frame is scanned on the lower portion of the screen, an image of a next frame is scanned on the upper portion of the screen. For example, if a time when one frame is completely scanned is T, a right eye image R is scanned on the entire screen at time 0 and the left eye image L is scanned on the entire screen at time T. However, since the right eye image R and the left eye image L are continuously changed between the time 0 and the time T, the left eye image L is scanned on the upper portion of the screen and the right eye image R is scanned on the lower portion of the screen between the time 0 and the time T. As a result, the left eye image L and the right eye image R share the screen for a sharing duration. If a backlight unit of a conventional apparatus is kept in an ON state during such a sharing duration, crosstalk occurs and one eye of a viewer simultaneously sees the right eye image R and the left eye image L. However, the apparatus of FIG. 1 can avoid such crosstalk by controlling the backlight unit 100.

Figure 3:
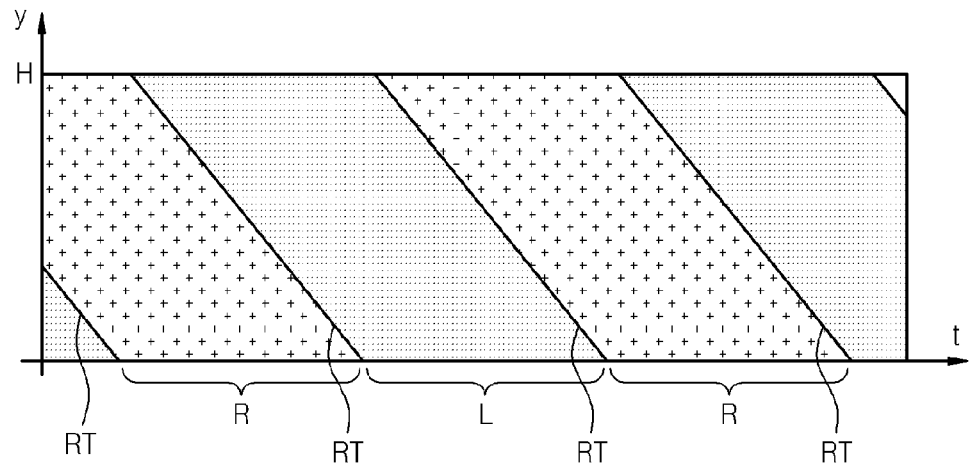
FIG. 3 is a timing diagram illustrating left eye images and right eye images scanned in the LCD of the apparatus of FIG. 1.

FIG. 3 is a timing diagram illustrating left eye images and right eye images scanned by the LCD 200 of the apparatus of FIG. 1. In FIG. 3, the vertical axis, which is a scanning direction, represents the vertical position of an image formed on the screen, and the horizontal axis represents time.

In FIG. 3, R denotes a right eye image scanning section, L denotes a left eye image scanning section, and an oblique line RT between the right eye image scanning section R and the left eye image scanning section L denotes a refresh time of a scan line according to the position of the image formed on the LCD 200. As described above with reference to FIG. 2, a sharing duration when a right eye image and a left eye image are simultaneously displayed exists. A vertical synchronizing signal Vsync coincides with a refresh time RT of a first scan line.

Figure 4:
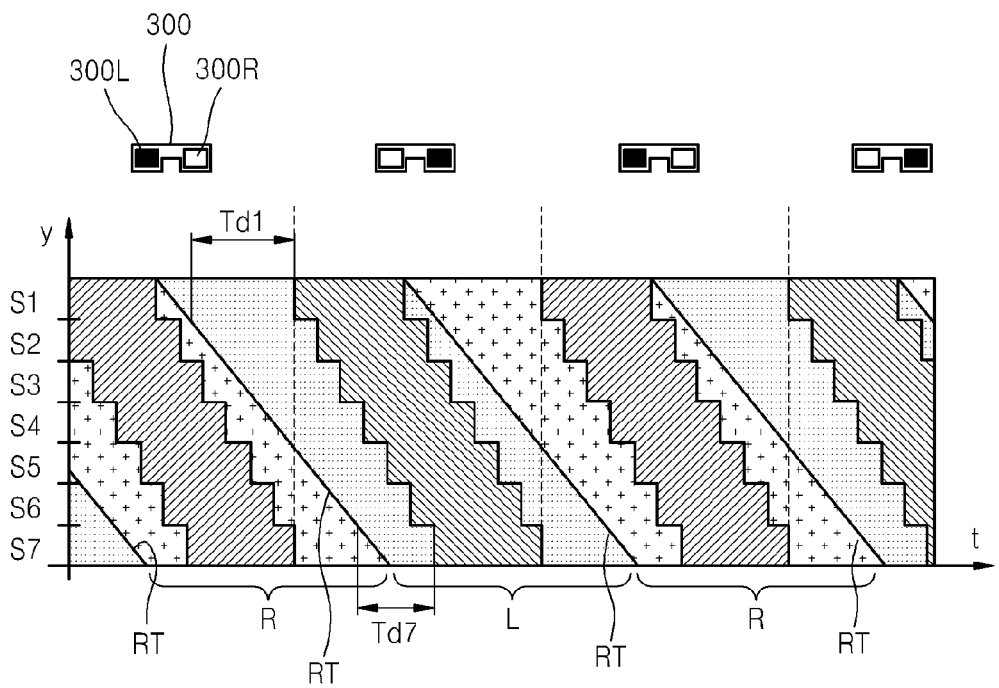
FIG. 4 is a timing diagram illustrating switch on/off times of segments of a backlight unit of the apparatus of FIG. 1, which provides background light to the LCD, according to an exemplary embodiment.

FIG. 4 is a timing diagram illustrating switch on/off times of the segments S1 through S7 of the backlight unit 100 of the apparatus of FIG. 1, which provides background light to the LCD 200, according to an exemplary embodiment. For convenience, RT denotes a refresh time of each of scan lines of the LCD 200, and hatched boxes extending on the horizontal axis represent switch-on times of the segments S1 through S7 of the backlight unit 100. One of the left filter 300L and the right filter 300R of the shutter glasses 300 which blocks light is illustrated in black and the remaining filter which transmits light is illustrated in white. The segments S1 through S7 of the backlight unit 100 correspond in a one-to-one manner to the image lines I1 through I7 of the LCD 200, and are switched on after delay times Td1 through Td7 in synchronization with the refresh times of the image lines I1 through I7 of the LCD 200 and are switched off before or at the same time with a refresh time of a next image. In detail, a delay time of one segment starts from a refresh time of a last scan line of a image line corresponding to the one segment, and thus the one segment is switched on after all scan lines of the image line corresponding to the one segment are refreshed. The shutter glasses 300 are synchronized with the switch-on time of the first segment S1. The left and right filters 300L and 300R of the shutter glasses 300 are alternately switched on, that is, once one of the left and right filters 300L and 300R is switched on, the other filter is switched off.

In FIG. 4, a vertical dotted line indicates that a switch-off time of the last segment S7 and a switch-on time of the first segment S1 coincide with each other. Alternatively, the switch-off time of the last segment S7 and the switch-on time of the first segment S1 may not coincide with each other, and a delay time may exist between the switch-off time of the last segment S7 and the switch-on time of the first segment S1. In other words, the last segment S7 may be switched off at the same time when the first segment S1 may be switched on, or the first segment S1 may be switched on a predetermined delay time after the last segment S7 may be switched off. Switch-off times of the segments S1 through S7 may coincide with, or partially or entirely precede a refresh time of a first scan line of each of the image lines I1 through I7. That is, a switch-off time of a segment may coincide with a refresh time of an image line, or precede a switch-off time of an image line. In FIG. 4, the switch-off time of the first segment S1 coincides with a refresh time of the first image line S1, and after that, predetermined delay times between switch-off times of the segments S2 through S7 and refresh times of the image lines I2 through I7 are increased gradually in the scanning direction.

The delay times Td1 through Td7 exist between the switch-on times of the segments S1 through S7 and the refresh times of the image lines I1 through I7. The delay times Td1 through Td7 of the segments S1 through S7 may be set in various ways. The delay time Td7 of the last segment S7 is shorter than the delay time Td1 of the first segment S1, and accordingly, the entire period of one image frame is confined within the period of opening one (left or right) shutter, which is equal to the frame period of the LCD 200 or to half of the switch period of the shutter glasses 300. Accordingly, there is no temporal overlap between left and right eye images.

Figure 5:
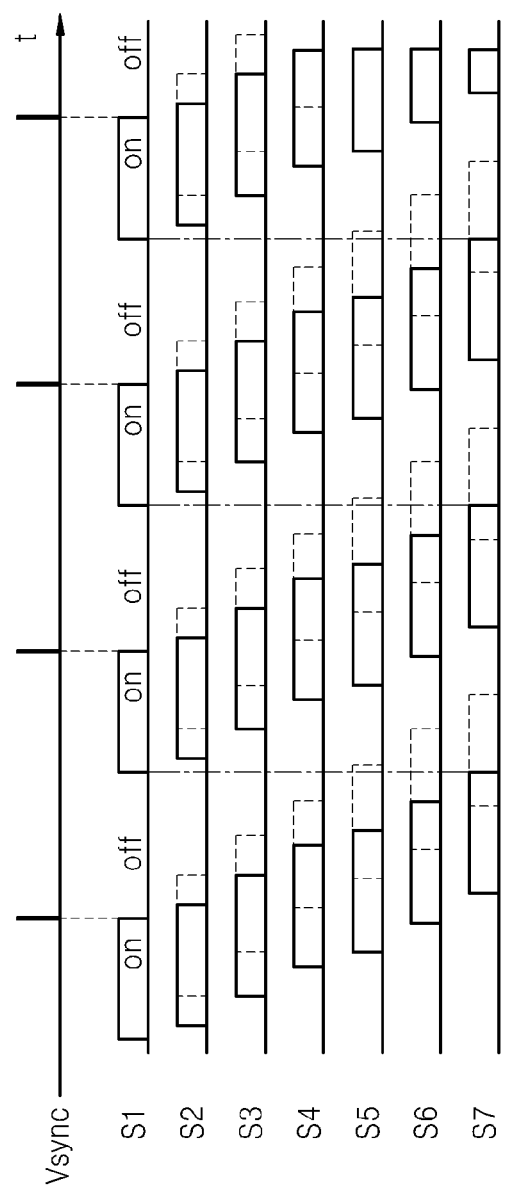
FIG. 5 is a timing diagram illustrating the switch on/off times of the segments of the backlight unit of the apparatus of FIG. 1 and switch on/off times of segments of a conventional apparatus.

FIG. 5 is a timing diagram illustrating the switch on/off times of the segments S1 through S7 of the backlight unit 100 of the apparatus of FIG. 1 and switch on/off times of segments of a conventional apparatus. In FIG. 5, boxes marked by dotted lines refer to the segments of the conventional apparatus, and boxes marked by solid lines refer to the segments S1 through S7 of the backlight unit 100 illustrated in FIG. 4. As seen from the boxes marked by the solid lines, left and right eye images do not overlap with each other, and may be separated by the shutter glasses 300.

Accordingly, a stereoscopic image can be displayed on the entire screen without crosstalk. Unlike the control of shutter glasses with a low duty cycle, the brightness of an image is not reduced, and any alteration in the control of the shutter glasses 300 is not required.

Figure 6:
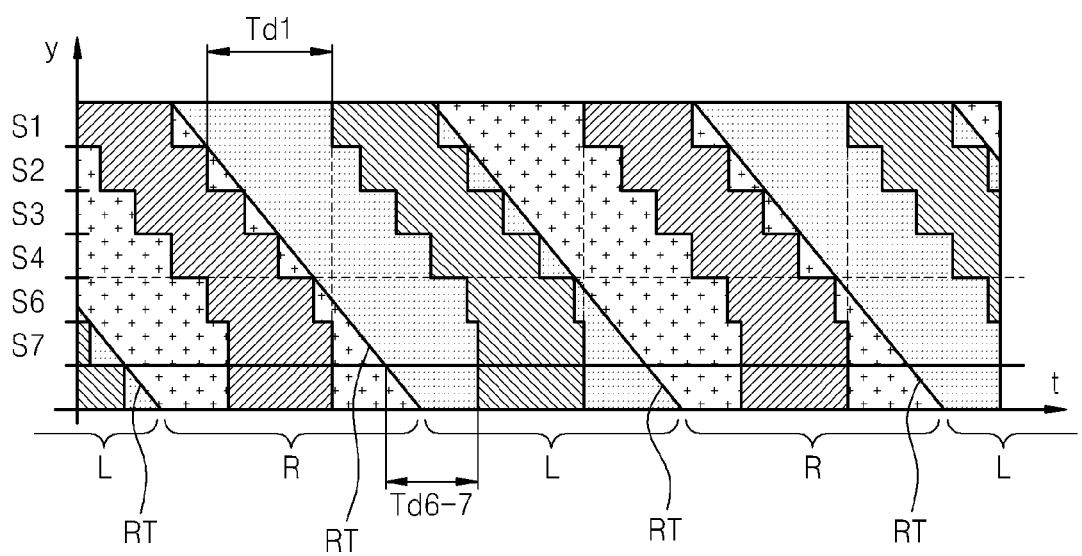
FIG. 6 is a timing diagram illustrating switch on/off times of segments of a backlight unit of the apparatus of FIG. 1, which provides background light to the LCD, according to another exemplary embodiment.

FIG. 6 is a timing diagram illustrating switch on/off times of the segments S1 through S7 of the backlight unit 100 of the apparatus of FIG. 1, which provides background light to the LCD 200, according to another exemplary embodiment.

Delay times of the segments S1 through S7 may be gradually or sequentially reduced in the scanning direction of the screen, for example, from top to bottom, or as shown in FIG. 6, upper segments may have the same delay time and other segments may have a delay time that is shorter than the same delay time of the upper segments. In detail, the segments S1 through S7 may be divided into at least two groups having different delay times, and segments of each of the at least two groups may have the same delay time under the control of the control unit 400.

Referring to FIG. 6, the first segments through the fourth segments S1 through S4 have the same delay time Td1, and the sixth segment S6 and the seventh segment S7 have the same delay time Td6-7 that is shorter than the delay time Td1. In general, the delay times are reduced in the scanning direction.

Although the switch-on times of the segments S1 through S7 are the same in FIGS. 4 and 5, the switch-on times of the segments S1 through S7 may be different from one another. Delay times of the last segment S7 and some segments preceding the last segment S7 should not be too short or too long. If the delay times are too short, crosstalk may occur due to an image of a previous frame during the low operation of the LCD 200, and if the delay times are too long, crosstalk may occur during a sharing duration for which left and right eye images overlap with each other. Accordingly, a delay time should be determined within an appropriate range.

Although the LCD 200 is a landscape LCD in which a scanning direction is from top to bottom in FIGS. 1 through 6, the LCD 200 may be a portrait LCD in which a scanning direction is from left to right or from right to left. The method and apparatus according to the exemplary embodiments can prevent crosstalk between left and right eye images in a stereoscopic system, and thus stereoscopic images with higher quality can be obtained.

While the exemplary embodiments have been particularly shown and described with reference to exemplary embodiments thereof, it will be understood by one of ordinary skill in the art that various changes in form and details may be made therein without departing from the spirit and scope of the exemplary embodiments as defined by the following claims.

What is claimed is:

1. A method of displaying a 3-dimensional (3D) image, the method comprising:
    alternately scanning a left eye image and a right eye image on a display device including a plurality of image lines that are arranged sequentially;
    illuminating the display device by using a backlight unit including a plurality of segments that correspond to the plurality of image lines and emit light in synchronization with refresh times of the plurality of image lines; and stopping light emission of each segment of the backlight unit when one of the left eye images and one of the right eye images are partially simultaneously scanned on each of the plurality of image lines corresponding to each segment of the backlight unit, wherein delay times are between switch-on times of the plurality of segments and refresh times of the plurality of image lines.

2. The method of claim 1, wherein the delay times are reduced in a scanning direction of the plurality of image lines.

3. The method of claim 2, wherein the delay times are reduced constantly and sequentially in the scanning direction of the plurality of image lines.

4. The method of claim 1, wherein the plurality of segments are divided into at least two groups having different delay times, and segments of one of the at least two groups have a same delay time.

5. The method of claim 1, wherein the plurality of segments have a same switch-on time.

6. The method of claim 5, wherein delay times between switch-off times of the segments and the refresh times of the image lines corresponding to the segments are increased in a scanning direction of the image lines.

7. The method of claim 1, wherein delay times between switch-off times of the plurality of segments and the refresh times of the image lines corresponding to the segments are increased in a scanning direction of the image lines.

8. The method of claim 1, wherein a first segment of the plurality of segments is switched on after at least a last segment of the plurality of segments is switched off.

9. An apparatus for displaying a 3D image, the apparatus comprising:
 a display device alternately scanning left eye images and right eye images and comprising a plurality of image lines that are arranged sequentially;
 a backlight unit comprising a plurality of segments that correspond to the plurality of image lines and emit light in synchronization with refresh times of the plurality of image lines;
 shutter glasses comprising a left shutter filter and a right shutter filter that respectively correspond to the left and the right eye images scanned on the display device and are switched on selectively; and
 a control unit which controls the backlight unit and the display device and stops light emission of each segment of the backlight unit when one of the left eye images and one of the right eye images are partially simultaneously scanned on each of the plurality of image lines corresponding to each segment of the backlight unit,
 wherein the control unit controls delay times to be between switch-on times of the plurality of segments and refresh times of the plurality of image lines.

10. The apparatus of claim 9, wherein the control unit controls the delay times to be reduced in a scanning direction of the plurality of image lines.

11. The apparatus of claim 10, wherein the control unit controls the delay times to be reduced constantly and sequentially in the scanning direction of the plurality of image lines.

12. The apparatus of claim 9, wherein the control unit controls each of the plurality of segments to have one of at least two different delay times.

13. The apparatus of claim 9, wherein the control unit controls the plurality of segments to have a same switch-on time.

14. The apparatus of claim 13, wherein the control unit controls delay times between switch-off times of the plurality of segments and the refresh times of the image lines corresponding to the segments to be increased in a scanning direction of the image lines.

15. The apparatus of claim 9, wherein the control unit controls delay times between switch-off times of the plurality of segments and the refresh times of the image lines corresponding to the segments to be increased in a scanning direction of the image lines.

16. The apparatus of claim 9, wherein the control unit controls a first segment of the plurality of segments to be switched on after at least a last segment of the plurality of segments is switched off.

17. An apparatus for displaying a 3D image, the apparatus comprising:
 a display device alternately scanning left eye images and right eye images and comprising a plurality of image lines that are arranged sequentially;
 a backlight unit comprising a plurality of segments that correspond to the plurality of image lines and emit light in synchronization with refresh times of the plurality of image lines;
 shutter glasses comprising a left shutter filter and a right shutter filter that respectively correspond to the left and the right eye images scanned on the display device and are switched on selectively; and
 a control unit which controls the backlight unit and the display device and controls a switch-off time of a last segment of the plurality of segments to be the same with a switch-on time of a first segment of the plurality of segments.

* * * * *